US007235604B2

(12) United States Patent
Blondel et al.

(10) Patent No.: US 7,235,604 B2
(45) Date of Patent: Jun. 26, 2007

(54) POLYAMIDE- AND POLYOLEFIN-BASED FIRE-RETARDED COMPOSITIONS

(75) Inventors: Philippe Blondel, Bernay (FR); Benoît Brule, Bernay (FR); Nicolas Frenois, Clermont-Ferrand (FR); Jean-Jacques Flat, Groupilleres (FR)

(73) Assignee: Atofina, Puteaux (FR)

( * ) Notice: Subject to any disclaimer, the term of this patent is extended or adjusted under 35 U.S.C. 154(b) by 242 days.

(21) Appl. No.: 10/602,005

(22) Filed: Jun. 24, 2003

(65) Prior Publication Data
US 2004/0054054 A1 Mar. 18, 2004

(30) Foreign Application Priority Data
Jun. 24, 2002 (FR) .................................. 02 07780

(51) Int. Cl.
*C08K 5/523* (2006.01)
(52) U.S. Cl. ...................... 525/140; 524/141; 524/145; 524/416; 524/450
(58) Field of Classification Search ........ 524/140–245, 524/416, 450, 127
See application file for complete search history.

(56) References Cited
U.S. PATENT DOCUMENTS

| | | | |
|---|---|---|---|
| 5,149,735 A | | 9/1992 | Bressan et al. |
| 5,439,976 A | * | 8/1995 | Kinoshita et al. .......... 525/92 F |
| 5,922,808 A | * | 7/1999 | Hanada et al. ................ 525/58 |
| 5,948,837 A | * | 9/1999 | Cicchetti et al. ............ 524/100 |
| 6,093,760 A | * | 7/2000 | Nishihara et al. ........... 524/145 |
| 6,218,493 B1 | * | 4/2001 | Johnson et al. ............. 526/351 |
| 6,605,655 B1 | * | 8/2003 | Kato et al. .................. 523/203 |
| 6,780,483 B1 | * | 8/2004 | Higuchi et al. ............ 428/36.7 |
| 6,780,936 B1 | * | 8/2004 | Agarwal et al. ............ 525/191 |

FOREIGN PATENT DOCUMENTS

EP 0427173 5/1991
EP 0629678 12/1994

OTHER PUBLICATIONS

Grant & Hackh's Chemical Dictionary , Fifth Edition , 1987, p. 408.*
The Condensed Chemical Dictionary, Tenth Edition, 1981, p. 836.*
Polymer Science Dictionary, Second Edition, Mark Alger, Chapman & Hall, pp. 290,433, 599.*
Database WPI, Section Ch, Week 200202, Derwent Publications Ltd., London, GB; AN 2002-013362, XP002237850.
Patent Abstracts of Japan; vol. 010, No. 043 (C-329), Feb. 20, 1986 & JP60192742A Toyo Soda Kogyo KK, Oct. 1, 1985.

* cited by examiner

*Primary Examiner*—Peter Szekely
(74) *Attorney, Agent, or Firm*—Millen, White, Zelano & Branigan, P.C.

(57) ABSTRACT

The present invention relates to fire-retarded compositions comprising, by weight, the total being 100 parts:
  50 to 75 parts of a blend of a polyamide (A) and a polyolefin (B),
  25 to 50 parts of a blend comprising:
    0.1 to 48.8 parts of a fire retardant,
    0.1 to 30 parts of a phosphorus-containing plasticizer,
    0.1 to 10 parts of a zeolite,
  the total of these three products being between 25 and 50.
These compositions have a V0 or V1 classification according to the UL94-VB test when a fire test is carried out on test specimens 1.6 mm in thickness. They have many advantages, in particular the elongation at break measured according to ISO R 527-1B exceeds 100%. As regards the impact strength, they have a non-brittle behaviour in multiaxial impact at room temperature according to ISO 6603-2 (at a rate of 7.7 m/s). They retain at least 50% of their mechanical properties after ageing for seven days at 120° C. in hot air.

These compositions are useful for insulating and protecting electrical cables and optical fibres and for moulding electrical cases and connectors.

29 Claims, No Drawings

POLYAMIDE- AND POLYOLEFIN-BASED FIRE-RETARDED COMPOSITIONS

FIELD OF THE INVENTION

The present invention relates to polyamide- and polyolefin-based fire-retarded compositions and more particularly to polyamide- and polyolefin-based thermoplastic compositions containing a fire retardant, a phosphorus-containing plasticizer and a zeolite. These compositions are useful for insulating and protecting electrical cables and optical fibres and for moulding electrical cases and connectors.

Thermoplastic polymers, such as polyethylenes, polyamides or blends thereof, are good electrical insulators and are easy to process. They are used for making electrical cases and connectors and also for cable jackets. Electrical installations may be the source of short circuits and catch fire; they may also come into contact with a flame and therefore catch fire and propagate the fire along cableways. Various additives exist for making these materials non-inflammable, some of them being halogen-based products and others being halogen-free. Halogen-based additives are being increasingly banned for ecotoxicologial and toxicologial reasons (toxicity and corrosivity of the vapors emitted during fires). The present invention relates to halogen-free fire-retarded compositions.

PRIOR ART AND THE TECHNICAL PROBLEM

EP 629 678 discloses polyamide/polypropylene blends in which a zeolite and ammonium polyphosphate (dehydrating agent) are added in order to make them fire-retarded. The polyamide/polyolefin blends consist (by weight) of 57% of nylon-6 (PA-6), 33% of a propylene homopolymer and 10% of a polypropylene grafted with maleic anhydride and then condensed with a monoamine polyamide oligomer. 30 parts (by weight) of ammonium polyphosphate (APP) and 1 part of zeolite were added in 69 parts of the above blends and then test specimens 3.2 mm in thickness were injection moulded. The UL94 reaction-to-fire tests were carried out on these test specimens according to the NFT 51072 standard, the V0 classification being obtained. V0 is the best classification according to this test. It corresponds to a material which is difficult to catch fire and produces no flaming drops during the test. In the case of V1, the material is easier to catch fire, but does not produce flaming drops during the test. As regards the V2 classification, in addition to the material being easier to catch fire than in the case of V0, flaming drops may also be produced during the test. These blends do not contain a phosphorus-containing plasticizer.

Patent EP 704 489 discloses compositions consisting of a polyamide matrix in which crosslinked polyolefin nodules and fire retardants, chosen from magnesium hydroxide, decabromodiphenyl ether, melamine cyanurate and pentaerythritol, are dispersed. These compositions are useful for sheathing electrical cables. They do not contain a phosphorus-containing plasticizer nor a zeolite.

The article by Le Bras et al, Polymer, 41, 5283-96, (2000) discloses blends of PA-6, EVA (ethylene/vinyl acetate copolymer) and ammonium polyphosphate (APP). They do not contain a phosphorus-containing plasticizer nor a zeolite.

Patent Application JP 11236472 A published on 31 Aug. 1999 discloses non-plasticized impact-modified non-compatibilized PA/PP blends fire-retarded by APP-based mixtures but not containing zeolites.

Patent Application JP 11302512 A published on 2 Nov. 1999 discloses impact-modified PAs reinforced by fibres and fire-retarded by phosphoric acid esters. These modified PAs do not contain zeolites.

Patent Application JP 2000160031 A published on 13 Jun. 2000 discloses PA-based non-compatibilized thermoplastic blends containing APP, triphenylphosphate optionally substituted on the aromatic rings, esters of $PO_3H_2$ and/or coated red phosphorus, melamine cyanurate, zinc borate and silane-type coupling agents. These blends do not contain a zeolite.

However, the fire resistance performance of the compositions of the prior art are generally obtained to the detriment of the ductility of the materials (considerable loss of elongation at break, brittle character in an impact at room temperature). Moreover, we have also shown that the thermal stability of these materials is insufficient. The term "thermal stability" is understood to mean the retention of the mechanical properties (and more particularly the elongation at break) after various types of thermal ageing (for example one week at 120° C. in hot air). The object of the invention is to find halogen-free fire-retarded polyamide/polyolefin blends performing well in the UL94 test but also possessing a good level of mechanical properties in tensile and impact tests, and good thermal stability. It has been found that the polyamide/polyolefin blend must necessarily include a fire retardant, a phosphorus-containing plasticizer and a zeolite.

BRIEF DESCRIPTION OF THE INVENTION

Novel polyamide- and polyolefin-based fire-retarded compositions have been found which have a V0 or V1 classification in the UL94-VB test when the fire test is carried out on test specimens 1.6 mm in thickness.

The present invention relates to fire-retarded compositions comprising, by weight the total being 100 parts:
  50 to 75 parts of a blend of a polyamide (A) and a polyolefin (B),
  25 to 50 parts ofa blend comprising:
    0.1 to 48.8 parts of a fire retardant
    0.1 to 30 parts of a phosphorus-containing plasticizer,
    0.1 to 10 parts of a zeolite,
    the total of these three products being between 25 and 50 parts.

According to an advantageous embodiment, they comprise, by weight, the total being 100 parts:
  55 to 75 parts of a blend of a polyamide (A) and a polyolefin (B),
  25 to 45 parts of a blend comprising:
    0.1 to 25 parts (preferably 16 to 25) of a fire retardant
    0.1 to 15 parts (preferably 8 to 15) of a phosphorus-containing plasticizer,
    0.1 to 5 parts (preferably 1 to 5) of a zeolite,
    the total of these three products being between 25 and 45 parts.

According to another advantageous embodiment, they comprise, by weight, the total being 100 parts:
  65 to 75 parts of a blend of a polyamide (A) and a polyolefin (B),
  25 to 35 parts of a blend comprising:
    0.1 to 20 parts (preferably 16 to 20) of a fire retardant,
    0.1 to 12 parts (preferably 8 to 12) of a phosphorus-containing plasticizer,
    0.1 to 3 parts (preferably to 3) of a zeolite,
    the total of these three products being between 25 and 35 parts.

These compositions have many advantages, in particular the elongation at break measured according to ISO R 527-1B on IFC (Institut Francais du Caoutchouc)-type test specimens exceeds 100% and is advantageously between 250 and 400%. As regards the impact strength, they exhibit non-brittle behaviour in multiaxial impact at room temperature according to ISO 6603-2 (at a rate of 7.7 m/s). The compositions of the invention retain at least 50% of their mechanical properties after ageing for seven days at 120° C. in hot air.

These compositions are useful for insulating and protecting electrical cables and optical fibres and for moulding electrical cases and connectors.

DETAILED DESCRIPTION OF THE INVENTION

With regard to the blend of a polyamide (A) and a polyolefin (B) the term "polyamide" is understood to mean products resulting from the condensation:
- of one or more amino acids, such as aminocaproic, 7-aminoheptanoic, 11-aminoundecanoic and 12-aminododecanoic acids or of one or more lactams, such as caprolactam, oenantholactam and lauryllactam;
- of one or more salts or mixtures of diamines, such as hexamethylenediamine, dodecamethylenediamine, metaxylylenediamine, bis-p(aminocyclohexyl)methane and trimethylhexamethylenediamine with diacids such as isophthalic, terephthalic, adipic, azelaic, suberic, sebacic and dodecanedicarboxylic acids.

By way of examples of a polyamide, mention may be made of PA-6 and PA-6,6.

It is also advantageous to use copolyamides. Mention may be made of the copolyamides resulting from the condensation of at least two alpha, omega-aminocarboxylic acids or of two lactams or of a lactam and of an alpha, omega-aminocarboxylic acid. Mention may also be made of the copolyamides resulting from the condensation of at least one alpha, omega-aminocarboxylic acid (or a lactam), at least one diamine and at least one dicarboxylic acid.

By way of examples of lactams, mention may be made of those having from 3 to 12 carbon atoms in the main ring and possibly being substituted. Mention may be made, for example, of β,β-dimethylpropriolactam, α,α-dimethylpropriolactam, amylolactam, caprolactam, capryllactam and lauryllactam.

By way of examples of alpha, omega-aminocarboxylic acids, mention may be made of aminoundecanoic acid and aminododecanoic acid. By way of examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid HOOC—$(CH_2)_{10}$—COOH.

The diamine may be an aliphatic diamine having from 6 to 12 carbon atoms or it may be an aryl diamine and/or a saturated cyclic diamine. By way of examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diamino-hexane, diamine polyols, isophoronediamine (IPD), methylpentamethylene-diamine (MPDM), bis(aminocyclohexyl)methane (BACM) and bis (3-methyl-4 aminocyclohexyl)methane (BMACM).

By way of examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-aminoundecanoic acid, adipic acid and hexamethylenediamine (PA-6/6,6/11/12) and copolymers of lauryllactam, azelaic acid and hexamethylenediamine (PA-6,9/12).

Advantageously, the copolyamide is chosen from PA-6/12 and PA-6/6,6.

It is possible to use polyamide blends. Advantageously, the relative viscosity of the polyamides, measured as a 1% solution in sulphuric acid at 20° C., is between 1.5 and 5.

It would not be outside the scope of the invention to replace part of polyamide (A) with a copolymer having polyamide blocks and polyether blocks, that is to say by using a blend comprising at least one of the above polyamides with at least one copolymer having polyamide blocks and polyether blocks.

The copolymers having polyamide blocks and polyether blocks result from the copolycondensation of polyamide blocks having reactive ends with polyether blocks having reactive ends, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;
3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

The polyether may, for example, be a polyethylene glycol (PEG), a polypropylene glycol (PPG) or a polytetramethylene glycol (PTMG). The latter is also called polytetrahydrofuran (PTHF).

The number-average molar mass $\overline{M}_n$ of the polyamide blocks is between 300 and 15000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react a polyetherdiol, a lactam (or an alpha, omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into polyetherdiamines and condensed with polyamide blocks having carboxylic ends. They may also be mixed with polyamide precursors and a chain stopper in order to make polyamide-block polyether-block polymers having randomly distributed units.

Polymers having polyamide and polyether blocks are described in U.S. Pat. Pat. Nos. 4,331,786, 4,115,475, 4,195, 015, 4,839,441, 4,864,014, 4,230,838 and 4,332,920.

The ratio of the amount of copolymer having polyamide blocks and polyether blocks to the amount of polyamide is, by weight, advantageously between 10/90 and 60/40. Mention may also be made, for example, of blends of (i) PA-6 and (ii) copolymers having PA-6 blocks and PTMG blocks and blends of (i) PA-6 and (ii) copolymers having PA-12 blocks and PTMG blocks.

Advantageously, the polyamide is such that its melting point is below 230° C. Advantageously, PA-6 is used.

As regards polyolefin (B) of the blend of a polyamide (A) and a polyolefin (B), this may or may not be functionalized or it may be a blend of at least one functionalized polyolefin and/or at least one unfunctionalized polyolefin. To simplify matters, functionalized polyolefins will be described below as (B1) and unfunctionalized polyolefins as (B2).

An unfunctionalized polyolefin (B2) is conventionally a homopolymer or a copolymer, of alpha-olefins or diolefins, such as, for example, ethylene, propylene, 1-butene, 1-octene and butadiene. By way of examples, mention may be made of:
    ethylene homopolymers and copolymers, particularly LDPE, HDPE, LLDPE (linear low-density polyethylene) or VLDPE (very low-density polyethylene) and metallocene polyethylene;
    propylene homopolymers and copolymers;
    ethylene/alpha-olefin copolymers such as ethylene/propylene copolymers; EPRs (abbreviation for ethylene-propylene rubbers); and ethylene/propylene/diene copolymers (EPDM);
    styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);
    copolymers of ethylene with at least one product chosen from salts or esters of unsaturated carboxylic acids such as alkyl (meth)acrylate (for example methyl acrylate), or vinyl esters of saturated carboxylic acids such as vinyl acetate (EVA), the proportion of comonomer possibly being as much as 40% by weight.

The functionalized polyolefin (B1) may be an alpha-olefin polymer having reactive units (the functional groups); such reactive units are acid, anhydride or epoxy functional groups. By way of example, mention may be made of the above polyolefins (B2) which are grafted or are copolymerized or terpolymerized with unsaturated epoxides such as glycidyl (meth)acrylate, or by carboxylic acids or the corresponding salts or esters, such as (meth)acrylic acid (this possibly being completely or partially neutralized by metals such as Zn, etc.) or else with carboxylic acid anhydrides such as maleic anhydride. A functionalized polyolefin is, for example, a PE/EPR blend, the weight ratio of which may vary between wide limits, for example between 40/60 and 90/10, the said blend being cografted with an anhydride, especially maleic anhydride, with a degree of grafting, for example, of 0.01 to 5% by weight.

The functionalized polyolefin (B1) may be chosen from the following (co)polymers, grafted with maleic anhydride or glycidyl methacrylate, in which the degree of grafting is, for example, from 0.01 to 5% by weight:
    PE, PP, copolymers of ethylene with propylene, butene, hexene, or octene and containing, for example, from 35 to 80% by weight of ethylene;
    ethylene/alpha-olefin copolymers such as ethylene/propylene copolymers; EPRs (abbreviation for ethylene-propylene rubbers); and ethylene/propylene/diene copolymers (EPDM);
    styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);
    ethylene/vinyl acetate copolymers (EVA), containing up to 40% by weight of vinyl acetate;
    ethylene/alkyl (meth)acrylate copolymers, containing up to 40% by weight of alkyl (meth)acrylate;
    ethylene/vinyl acetate (EVA)/alkyl (meth)acrylate terpolymers, containing up to 40% by weight of comonomers.

The functionalized polyolefin (B1) may also be chosen from ethylene/propylene copolymers containing predominantly propylene, these being grafted with maleic anhydride and then condensed with monoaminated polyamide (or polyamide oligomer) (products described in EP-A-0 342 066).

The functionalized polyolefin (B1) may also be a copolymer or terpolymer of at least the following units: (1) ethylene, (2) an alkyl (meth)acrylate or a vinyl ester of a saturated carboxylic acid and (3) an anhydride such as maleic anhydride or a (meth)acrylic acid or an epoxy such as glycidyl (meth)acrylate. By way of examples of functionalized polyolefins of this latter type, mention may be made of the following copolymers, in which the ethylene preferably represents at least 60% by weight and in which the termonomer (the functional group) represents, for example, from 0.1 to 10% by weight of the copolymer:
    ethylene/alkyl (meth)acrylate/(meth)acrylic acid or maleic an hydride or glycidyl methacrylate copolymers;
    ethylene/vinyl acetate/maleic anhydride or glycidyl methacrylate copolymers;
    ethylene/vinyl acetate or alkyl (meth)acrylate/(meth) acrylic acid or maleic anhydride or glycidyl methacrylate copolymers.

In the above copolymers, the (meth)acrylic acid may be salified with Zn or Li.

The term "alkyl (meth)acrylate" in (B1) or (B2) denotes $C_1$ to $C_8$ alkyl methacrylates and acrylates, and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the aforementioned polyolefins (B1) may also be crosslinked by any suitable process or agent (diepoxy, diacid, peroxide, etc.); the term functionalized polyolefin also includes blends of the aforementioned polyolefins with a difunctional reactive agent such as a diacid, dianhydride, diepoxy, etc., which is capable of reacting with them or blends of at least two functionalized polyolefins able to react together.

The copolymers mentioned above, (B1) and (B2), may be copolymerized so as to form random or block copolymers and may have a linear or branched structure.

The molecular weight, the MFI index and the density of these polyolefins may also vary over a wide range, as those skilled in the art will appreciate. MFI is the abbreviation for Melt Flow Index. It is measured according to the ASTM 1238 standard.

Advantageously, the unfunctionalized polyolefins (B2) are chosen from propylene homopolymers or copolymers and any ethylene homopolymer or copolymer of ethylene and a comonomer of higher alpha-olefin type, such as butene, hexene, octene or 4-methyl-1-pentene. Mention may be made, for example, of high-density PP and PE, medium-density PE, linear low-density PE, low-density PE and very low-density PE. These polyethylenes are known to those skilled in the art as being produced by a "radical" process, by "Ziegler"-type catalysis or, more recently, by so-called "metallocene" catalysis.

Advantageously, the functionalized polyolefins (B1) are chosen from any polymer comprising alpha-olefin units and units carrying polar reactive functional groups such as epoxy, carboxylic acid or carboxylic acid anhydride functional groups. By way of examples of such polymers, mention may be made of ethylene/alkyl acrylate/maleic anhydride or ethylene/alkyl acrylate/glycidyl methacrylate terpolymers, such as the LOTADER® polymers from the Applicant, or maleic-anhydride-grafted polyolefins such as the OREVAC® polymers from the Applicant, as well as ethylene/alkyl acrylate/(meth)acrylic acid terpolymers. Mention may also be made of propylene homopolymers and copolymers grafted with a carboxylic acid anhydride and then condensed with polyamides or monoaminated polyamide oligomers.

The MFI of (A) and the MFIs of (B1) and (B2) may be chosen within a wide range; however, it is recommended, in order to facilitate the dispersion of (B), that the MFI of (A) be greater than that of (B).

For small proportions of (B), for example 10 to 15 parts, it is sufficient to use an unfunctionalized polyolefin (B2). The proportion of (B2) and (B1) in the (B) phase depends on the amount of functional groups present in (B1) and on their reactivity. Advantageously, (B1)/(B2) weight ratios ranging from 5/35 to 15/25 are used. It is also possible, for low proportions of (B), to use only a blend of polyolefins (B1) in order to obtain crosslinking.

According to a first preferred embodiment of the invention, the polyolefin (B) comprises (i) a high-density polyethylene (HDPE) and (ii) a blend of a polyethylene (C1) and a polymer (C2) chosen from elastomers, very low-density polyethylenes and ethylene copolymers, the (C1)+(C2) blend being cografted with an unsaturated carboxylic acid.

According to a variant of this first embodiment of the invention, the polyolefin (B) comprises (i) a high-density polyethylene (HDPE), (ii) a polymer (C2) chosen from elastomers, very low-density polyethylenes and ethylene copolymers, (C2) being grafted with an unsaturated carboxylic acid and (iii) a polymer (C'2) chosen from elastomers, very low-density polyethylenes and ethylene copolymers.

According to a second preferred embodiment of the invention, the polyolefin (B) comprises (i) polypropylene and (ii) a polyolefin which results from the reaction of a polyamide (C4) with a copolymer (C3) comprising propylene and an unsaturated monomer X, grafted or copolymerized.

According to a third preferred embodiment of the invention, the polyolefin (B) comprises (i) a polyethylene of the EVA, LLDPE, VLDPE or metallocene type and (ii) an ethylene/alkyl (meth)acrylate/maleic anhydride copolymer.

According to a fourth preferred embodiment of the invention the polyolefin comprises two functionalized polymers containing at least 50 mol % of ethylene units and able to react in order to form a crosslinked phase. According to a variant, the polyamide (A) is chosen from blends of (i) a polyamide and (ii) a copolymer having PA-6 blocks and PTMG blocks and blends of (i) a polyamide and (ii) a copolymer having PA-12 blocks and PTMG blocks, the weight ratio of the amount of copolymer to the amount of polyamide being between 10/90 and 60/40.

With regard to the first embodiment, the proportions (by weight) are advantageously the following:

60 to 70% of polyamide, 5 to 15% of the cografted blend of (C1) and (C2), the balance being high-density polyethylene.

With regard to the high-density polyethylene, its density is advantageously between 0.940 and 0.965 g/cm$^3$ and the MFI between 0.1 and 5 g/10 min (190° C./2.16 kg).

The polyethylene (C1) may be chosen from the above-mentioned polyethylenes. Advantageously, (C1) is a high-density polyethylene (HDPE) having a density between 0.940 and 0.965 g/cm$^3$. The MFI of (C1) is between 0.1 and 3 g/10 min (190° C./2.16 kg).

The copolymer (C2) may, for example, be an ethylene-propylene elastomer (EPR) or ethylene/propylene/diene elastomer (EPDM). (C2) may also be a very low-density polyethylene (VLDPE) which is either an ethylene homopolymer or an ethylene/alpha-olefin copolymer. (C2) may also be a copolymer of ethylene with at least one product chosen from (i) unsaturated carboxylic acids, their salts and their esters, (ii) vinyl esters of saturated carboxylic acids and (iii) unsaturated dicarboxylic acids, their salts, their esters, their half-esters and their anhydrides. Advantageously (C2) is an EPR.

Advantageously, 60 to 95 parts of (C1) per 40 to 5 parts of (C2) are used.

The blend of (C1) and (C2) is grafted with an unsaturated carboxylic acid, that is to say (C1) and (C2) are cografted. It would not be outside the scope of the invention to use a functional derivative of this acid. Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methylbicyclo[2.2.1]hept-5-ene-2,2-dicarboxylic anhydrides. Advantageously maleic anhydride is used.

Various known processes can be used to graft a grafting monomer onto the blend of (C1) and (C2). For example, this may be achieved by heating the polymers (C1) and (C2) to a high temperature, about 150° C. to about 300° C., in the presence or absence of a solvent and with or without a radical initiator.

In the graft-modified blend of (C1) and (C2) obtained in the abovementioned manner, the amount of grafting monomer may be chosen appropriately, but it is preferably from 0.01 to 10% and better still from 600 ppm to 2%, with respect to the weight of cografted (C1)+(C2). The amount of grafted monomer is determined by assaying the succinic functional groups by FTIR spectroscopy. The MFI (190° C./2.16 kg) of the cografted (C1)+(C2) is 5 to 30 and preferably 13 to 20 g/10 min.

Advantageously, the cografted (C1)+(C2) blend is such that the $MFI_{10}/MFI_2$ ratio is greater than 18.5, $MFI_{10}$ denoting the melt flow index at 190° C. with a load of 10 kg and $MFI_2$ denoting the melt flow index with a load of 2.16 kg. Advantageously, the $MFI_{20}$ of the blend of the cografted polymers (C1) and (C2) is less than 24 g/10 min. $MFI_{20}$ denotes the melt flow index at 190° C. with a load of 21.6 kg.

With regard to the variant of the first embodiment, the proportions (by weight) are advantageously the following:
60 to 70% of polyamide,
5 to 10% of grafted (C2),
5 to 10% of (C'2),
the balance being high-density polyethylene.

Advantageously, (C2) is an EPR or an EPDM. Advantageously, (C'2) is an EPR containing 70 to 75% ethylene by weight.

With regard to the second embodiment of the invention, the proportions (by weight) are advantageously the following:
60 to 70% of polyamide,
20 to 30% of polypropylene,
3 to 10% of a polyolefin which results from the reaction of a polyamide (C4) with a copolymer (C3) comprising propylene and an unsaturated monomer X, grafted or copolymerized.

The MFI (230° C./2.16 kg) of the polypropylene is advantageously less than 0.5 g/10 min and preferably between 0.1 and 0.5 g/10 min. Such products are described in EP 647 681.

The grafted product of this second embodiment of the invention will now be described. Firstly (C3) is prepared, this being either a copolymer of propylene and an unsaturated monomer X, or a polypropylene onto which an unsaturated monomer X is grafted. X is any unsaturated monomer that can be copolymerized with propylene or grafted onto polypropylene and having a functional group capable of reacting with a polyamide. This functional group may, for example, be a carboxylic acid, a dicarboxylic acid anhydride or an epoxide. As examples of monomer X, mention may be made of (meth)acrylic acid, maleic anhydride and unsaturated epoxides such as glycidyl (meth)acrylate. Advantageously, maleic anhydride is used. With regard to the grafted polypropylenes, X may be grafted onto propylene homopolymers or copolymers, such as ethylene/propylene copolymers consisting predominantly (in moles) of propylene. Advantageously, (C3) is such that X is grafted. The grafting is an operation known per se.

(C4) is a polyamide or a polyamide oligomer. Polyamide oligomers are described in EP 342 066 and FR 2 291 225. The polyamides (or oligomers) (C4) are products resulting from the condensation of the above-mentioned monomers. Polyamide blends may be used. It is advantageous to use PA-6, PA-11, PA-12, a copolyamide having PA-6 units and PA-12 units (PA-6/12) and a copolyamide based on caprolactam, hexamethylenediamine and adipic acid (PA-6/6,6). The polyamides or oligomers (C4) may have acid, amine or monoamine terminal groups. In order for the polyamide to have a monoamine terminal group, all that is required is to use a chain stopper of formula:

in which:

$R_1$ is hydrogen or a linear or branched alkyl group containing up to 20 carbon atoms;

$R_2$ is a linear or branched, alkyl or alkenyl group having up to 20 carbon atoms, a saturated or unsaturated cycloaliphatic radical, an aromatic radical or a combination of the above. The chain stopper may, for example, be laurylamine or oleylamine.

Advantageously, (C4) is a PA-6, a PA-11 or a PA-12. The proportion by weight of (C4) in (C3)+(C4) is advantageously between 0.1 and 60%. The reaction of (C3) with (C4) preferably takes place in the melt state. For example, it is possible to mix (C3) and (C4) in an extruder at a temperature generally between 230 and 250° C. The average residence time of the melt in the extruder may be between 10 seconds and 3 minutes and preferably between 1 and 2 minutes.

With regard to the third embodiment, the proportions (by weight) are advantageously the following:
60 to 70% of polyamide,
5 to 15% of an ethylene/alkyl (meth)acrylate/maleic anhydride copolymer,
the balance being a polyethylene of the EVA, LLDPE, VLDPE or metallocene type; advantageously the density of the LLDPE, VLDPE or metallocene polyethylene is between 0.870 and 0.925, and the MFI is between 0.1 et 5 g/10 min (190° C. /2.16 kg).

Advantageously, the ethylene/alkyl (meth)acrylate/maleic anhydride copolymers contain from 0.2 to 10% by weight of maleic anhydride and up to 40% and preferably 5 to 40% by weight of alkyl (meth)acrylate. Their MFIs are between 2 and 100 g/10 min (190° C./2.16 kg). The alkyl (meth)acrylates have already been mentioned above. The melting point is between 80 and 120° C. These copolymers are commercially available. They are produced by radical polymerization at a pressure that may be between 200 and 2500 bar.

With regard to the fourth embodiment, the proportions (by weight) are advantageously the following:
40 to 95% of a polyamide,
60 to 5% of a blend of an ethylene/alkyl (meth)acrylate/ maleic anhydride copolymer and of an ethylene/alkyl (meth)acrylate/glycidyl (meth)acrylate copolymer.

Advantageously, the ethylene/alkyl (meth)acrylate/maleic anhydride copolymers contain from 0.2 to 10% by weight of maleic anhydride and up to 40%, and preferably 5 to 40%, by weight of alkyl (meth)acrylate. Their MFIs are between 2 and 100 g/10 min (190° C./2.16 kg). The alkyl (meth) acrylates have already been described above. The melting point is between 80 and 120° C. These copolymers are commercially available. They are produced by radical polymerization under pressure of between 200 and 2500 bar.

The ethylene/alkyl (meth)acrylate/glycidyl methacrylate copolymer may contain up to 40%, advantageously 5 to 40%, by weight of alkyl (meth)acrylate and up to 10%, preferably 0.1 to 8%, by weight of unsaturated epoxide.

Advantageously, the alkyl (meth)acrylate is chosen from methyl (meth)acrylate, ethyl acrylate, n-butyl acrylate, isobutyl acrylate and 2-ethylhexyl acrylate. The amount of alkyl (meth)acrylate is preferably from 20 to 35%. The MFI is advantageously between 5 and 100 g/10 min (190° C./2.16 kg) and the melting point is between 60 and 110° C. This copolymer can be obtained by radical polymerization of the monomers.

It is possible to add catalysts for accelerating the reaction between the epoxide and anhydride functional groups; among the compounds capable of accelerating the reaction between the epoxy functional group and the anhydride functional group, mention may be made in particular of:

tertiary amines, such as dimethyllaurylamine, dimethylstearylamine, N-butylmorpholine, N,N-dimethylcyclohexylamine, benzyldimethylamine, pyridine, dimethylamino-4-pyridine, methyl-I-imidazole, tetramethylethyl-hydrazine, Ia N,N-dimethylpiperazine, Ia N,N,N',N'-tetramethyl-I, 6-hexane-diamine, a blend of tertiary amines having from 16 to 18 carbon atoms and known as dimethyltallowamine:

tertiary phosphines, such as triphenylphosphine;

zinc alkyldithiocarbamates; and acids.

It would not be outside the scope of the invention if part of the ethylene/alkyl (meth)acrylate/maleic anhydride copolymer were to be replaced with an ethylene/acrylic acid copolymer or an ethylene/maleic anhydride copolymer, the maleic anhydride having been completely or partly hydrolyzed. These copolymers may also comprise an alkyl (meth) acrylate. This part may represent up to 30% of the ethylene/alkyl (meth)acrylate/maleic anhydride copolymer.

With regard to the fire retardants, these are compounds capable at the moment of combustion of forming acids such as $H_3PO_4$, $H_3PO_3$ and $H_4P_2O_7$. As an illustration of such fire retardants, mention may be made of ammonium phosphates, pyrophosphates and polyphosphates, melamine phosphates, melamine phosphite, piperazine phosphite and diphosphite, guanazole phosphate, melamine pyrohoshate and piperazine pyrophosphate. It is advantageous to use ammonium polyphosphates of formula $(NH_4)_{n+2}P_nO_{3n+1}$ in which n represents an integer greater than or equal to 2. The ammonium polyphosphate may be encapsulated in a melamine-based resin. It would not be outside the scope of the invention to use a blend of fire retardants. The fire retardant may be functionalized, for example it may carry silane functional groups.

With regard to the phosphorus-containing plasticizer, mention may be made of phosphoric acid esters. By way of example, mention may be made of isopropylphenyl phosphate, diphenyl phosphate and triphenyl phosphate.

With regard to the zeolites, these are described in Ullmann's Encyclopedia of Industrial Chemistry, 1996, 5th edition, Vol. 28, pages 475–504. Zeolites of the A, X, Y, L, ZSM and ZM type or also natural zeolites such as chabazite, Ia mordenite and faujasite may be used. Advantageously, zeolites of the 3A, 4A, 5A, 10X and 13X type are used. It would not be outside the scope of the invention to use a blend of zeolites.

The zeolites are generally used in the form of a powder having a particle size of more than 1 μm and preferably between 2 and 50 μm.

It would not be outside the scope of the invention to substitute these zeolites with mineral additives known by the name "acid scavengers". By way of example, mention may be made of DHT 4A from Kyowa Chemical.

It would not be outside the scope of the invention to substitute the PA with a PA modified by mineral or organic fillers of nanometric size, known by the name "PA nanocomposite". In this case, the proportion of fire retardant may be reduced by being in the lower part of the range.

In addition to the three above products, it is possible to add any halogen-free additive well known to those skilled in the art in the field of PAs, such as melamine cyanurates, melamine pyrophosphates and silicone- or fluorine-based anti-drop agents.

The compositions according to the invention may furthermore contain at least one additive chosen from:

dyes;

pigments;

whiteners;

antioxidants;

UV stabilizers.

The compositions of the invention are prepared by blending all the ingredients (A, B, fire retardant, phosphorus-containing plasticizer, zeolite) in a "direct" process or by adding the fire retardant, the phosphorus-containing plasticizer and the zeolite to the A/B blend already prepared.

Advantageously, standard blending and mixing machines from the thermoplastics industry may be used, such as extruders and mixers, for example Buss® Co-Kneaders. In this second process (called "rework" process), the four ingredients (A+B, fire retardant, phosphorus-containing plasticizer and zeolite) may either be dry-blended and introduced into the feed hopper or else the fire retardant and the phosphorus-containing plasticizer blended with the zeolite may be introduced by lateral feeding into the premelted A/B blend.

It is recommended that the compounding of the compositions of the invention and their processing be carried out under the gentlest possible conditions in terms of temperature and amount of shear. To do this, the reader may refer to the reference work: O. Schacker, Plastics Additives and Compounding, April 2002, pages 28–33.

EXAMPLES

Products Used:

Orgalloy® LE6000: PA-6/LLDPE alloy having an MFI of 2 (235° C./2.16 kg) produced by Atofina.

PA-6 B3: PA-6 of 17 to 23 MFI (at 235° C./2.16 kg) produced by BASF under the name ULTRAMID B3®.

PA-6 B4: PA-6 of 1.5 to 3 MFI (at 235° C./2.16 kg) produced by BASF under the name Ultramid B4®.

LL 7209 M: LLDPE having a density of 0.920 g/cm$^3$ and an MFI of 1 (190° C./2.16 kg) sold under the name INNOVEX® LL 7209 AA produced by BP Chemicals.

EVA 2403: Ethylene/vinyl acetate copolymer (EVA) containing 24 wt % acetate and having an MFI of 3 (190° C./2.16 kg) sold by Atofina under the name EVATANE® 2403.

LOTADER® 3210: Ethylene/butylacrylate/maleic anhydride terpolymer having an MFI of 5 (190° C./2.16 kg) containing 6 wt % acrylate and 3% maleic anhydride sold by Atofina.

LOTADER® 4700: Ethylene/ethyl acrylate/maleic anhydride terpolymer having an MFI of 7 (190° C./2.16 kg) containing 30 wt % acrylate and 1.5 wt % maleic anhydride sold by Atofina.

LOTADER® AX8900: Ethylene/methyl acrylate/glycidyl methacrylate terpolymer having an MFI of 6 (190° C./2.16 kg) containing 25 wt % acrylate and 8 wt % glycidyl methacrylate sold by Atofina.

LUCALENE® 3110: Ethylene/butyl acrylate/acrylic acid terpolymer of 88/8/4 composition by weight sold by BASF.

PLATAMID® MX 1937: Copolyamide based on caprolactam, lauryllactam, aminoundecanoic acid (C11) acid and polyethylene glycol having a melting point of 105–115° C. and an MFI of 19 (150° C./2.16 kg) produced by Atofina.

FR CROSS 484F: Ammonium polyphosphate having a mean particle diameter of 8 μm produced by Buddenheim.

EXOLIT® AP 422: Ammonium polyphosphate microencapsulated with a melamine resin, sold by Clariant.

PARALOÏD® EXL 3611: Acrylic impact modifier in the form of core/shell particles produced by Rohm and Haas.

PHOSPHFLEX® 31 L: Isopropylphenyl/diphenyl phosphate produced by Akzo.

PHOSFLEX® TPP: Triphenyl phosphate produced by Akzo.

DHT 4A: Mineral acid scavenger sold by Kyowa Chemical.

SILIPORITE® NK10AP: Zeolite of the 4 Ångström type produced by CECA.

ANTI 51: IRGANOX® 1098 antiodixant from Ciba-Geigy.

ANTI 82: HOSTANOX PAR 24 from Hoechst.

IODINE P201: Thermostabilizer based on copper potassium iodide sold by Ciba-Geigy.

2. Compounding of the Fire-Retarded Materials

The formulations described below were compounded using a self-cleaning meshing corotating extruder of the Werner and Pfleiderer® ZSK 40 type (Diameter: 40 mm, Length: 42D) at 240–250° C.

3. Tests Carried Out

Tensile test: Tensile strength and elongation at break were measured according to the ISO R527-1B standard on IFC (Institut Francais du Caoutchouc [French Rubber Institute]) test specimens after conditioning of two weeks at 23° C. and 50% RH (relative humidity).

Multiaxial impact strength measurement at room temperature according to ISO 6603-2 at a rate of 7.7 m/s.

Fire test: Classification of the materials according to UL94-VB.

Melt flow index (MFI) at 235° C./2.16 kg according to ASTM 1238.

3. Results

These are given in Tables 1 and 2. The compositions are by weight.

TABLE 1

| | Ex 1 | Ex 2 | Ex 3 | Ex 4 | Ex 5 |
|---|---|---|---|---|---|
| ORGALOY LE 6000 | | | | | |
| PA6 B4 | | | | | |
| PA6 B3 | 32 | 32 | 32 | 32 | 32 |
| LL 7209 AA | | | | | |
| EVA 2403 | 30.9 | 30.9 | 30.9 | 30.9 | 30.9 |
| LOTADER 3210 | 6.5 | 6.5 | 6.5 | 6.5 | 6.5 |
| LOTADER 4700 | | | | | |
| LOTADER AX 8900 | | | | | |
| LUCALENE M3110 | | | | | |
| PLATAMID MX 1937 | | | | | |
| FR CROSS 484F | | | | | |
| EXOLIT AP 422 | 18 | 18 | 18 | 18 | 18 |
| EXL 3611 | | | 1 | | |
| PHOSPHLEX 31L | 10 | 10 | 10 | | |
| PHOSPHLEX TPP | | | | 10 | 10 |
| DHT4A | 2 | | 1 | 2 | |
| SILIPORITE NK10AP | | 2 | | | 2 |
| ANTI 51 + ANTI 82 (0.5/0.2) | | | | | |
| IODINE P201 | 0.6 | 0.6 | 0.6 | 0.6 | 0.6 |
| MFI (235° C., 2.16 kg) | 11.9 | 11.8 | 12.7 | 6.6 | 13 |
| UL94 VB | V0 | V0 | V0 | V0 | V0 |
| LOI | | | | | |
| Elongation at break (%) | 313 | 338 | 285 | 371 | 348 |
| Tensile strength (MPa) | 18.5 | 20.9 | 18.8 | 23.2 | 19.6 |
| Multiaxial impact (23° C.)* | | | | | |
| Type of fracture | | | | | |
| Elongation at break *** (%) | 225 | 247 | 159 | 255 | 243 |
| % retention of elongation | 71.88% | 73.08% | 55.79% | 68.73% | 69.83% |
| Tensile strength *** (MPa) | 19.1 | 20 | 17.3 | 20.2 | 17.8 |
| % retention of strength | 103.24% | 95.69% | 92.02% | 87.07% | 90.82% |

* Total energy (N, m)

** Semi-ductiile

*** After heat ageing for 120° C. for 1 week in air.

TABLE 2

|  | (comparative examples) | | | | | | |
|---|---|---|---|---|---|---|---|
|  | C Ex 1 | C Ex 2 | C Ex 3 | C Ex 4 | C Ex 5 | C Ex 6 | C Ex 7 |
| ORGALLOY LE 6000 |  |  |  |  |  | 59 |  |
| PA6 B4 |  |  |  |  |  |  | 45 |
| PA6 B3 | 37 | 44.2 | 45.7 | 32 | 32 |  |  |
| LL 7209 AA |  | 17 | 17.6 |  |  |  |  |
| EVA 2403 | 35.4 |  |  | 30.9 | 30.9 |  |  |
| LOTADER 3210 | 7 | 6.25 | 7 | 6.5 | 6.5 |  |  |
| LOTADER 4700 |  |  |  |  |  |  | 12 |
| LOTADER AX 8900 |  |  |  |  |  |  | 6 |
| LUCALENE M3110 |  |  |  |  |  |  | 6 |
| PLATAMID MX 1937 |  |  |  |  |  | 11 |  |
| FR CROSS 484F |  | 30 | 15 |  |  | 18 |  |
| EXOLIT AP 422 |  |  |  | 18 | 18 |  | 19.3 |
| EXL 3611 |  |  | 2 | 2 | 2 | 2 |  |
| PHOSPHLEX 31L |  |  | 12 | 10 |  | 10 | 10 |
| PHOSPHLEX TPP | 18 |  |  |  | 10 |  |  |
| DHT4A |  |  |  |  |  |  |  |
| SILIPORITE NK10AP | 2 | 2 |  |  |  |  | 1 |
| ANTI 51 + ANTI 82 (0.5/0.2) |  | 0.55 | 0.7 |  |  |  | 0.7 |
| IODINE P201 | 0.6 |  |  | 0.6 | 0.6 |  |  |
| MFI (235° C., 2.16 kg) | 3 |  | 9 | 16 | 22 | 18 | 1.3 |
| UL94 VB | V2 | V0 | V0 | V0 | V0 | V0 | V0 |
| LOI |  | 39 |  |  |  |  |  |
| Elongation at break (%) | 267 | 6 | 136 | 232 | 260 | 175 | 167 |
| Tensile strength (MPa) | 22.7 |  | 22.4 | 16 | 16.9 | 21.3 | 24 |
| Multiaxial impact (23° C.)* |  |  |  |  |  | 49 |  |
| Type of fracture |  |  |  |  |  | SD |  |
| Elongation at break *** (%) | 193 |  | 26 | 56 | 58 | 33 | 85 |
| % retention of elongation | 72.30% |  | 19.12% | 24.14% | 22.31% | 18.80% | 51% |
| Tensile strength *** (MPa) | 25.1 |  |  | 15.9 | 15.6 |  | 26 |
| % retention of strength | 110.57% |  |  | 99.38% | 92.31% |  | 108% |

\* Total energy (N, m)
\*\* Semi-ductiile
\*\*\* After heat ageing for 120° C. for 1 week in air.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure of all applications, patents and publications, cited herein and of corresponding French application No. 02 07780, filed Jun. 24, 2002, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A fire-retardant composition, comprising, by weight, based on 100 parts weight total:
    50 to 75 parts of a blend of a component (A) comprising a polyamide and a component (B) comprising at least one of: a homopolymer or copolymer of alpha-olefins and/or diolefins, a metallocene polyethylene, a copolymer of ethylene with a salt or ester of an unsaturated carboxylic acid or a vinyl ester of a saturated carboxylic acid, or one of the above polymers functionalized with an acid, anhydride or epoxy functional group, or one of the above polymers grafted with maleic anhydride or glycidyl methacrylate, the above polymers optionally being crosslinked, and
    25 to 50 parts of a blend comprising:
        0.1 to 48.8 parts of a halogen-free fire retardant,
        0.1 to 30 parts of a phosphorus-containing plasticizer, and
        0.1 to 10 parts of a zeolite,
    wherein either:
    the fire retardant is selected from the group consisting of: ammonium phosphates, pyrophosphates, polyphosphates, melamine phosphates, melamine phosphite, piperazine phosphite, piperazine diphosphite, guanazole phosphate, melamine pyrophoshate and piperazine pyrophosphate, or
    the phosphorus-containing plasticizer is selected from the group consisting of: isopropylphenyl phosphate, diphenyl phosphate and triphenyl phosphate.

2. A composition according to claim 1 comprising, by weight, based on 100 parts weight total:
    55 to 75 parts of a blend of a component (A) comprising a polyamide and a component (B) comprising at least one of: a homopolymer or copolymer of alpha-olefins and/or diolefins, a metallocene polyethylene, a copolymer of ethylene with a salt or ester of an unsaturated carboxylic acid or a vinyl ester of a saturated carboxylic acid, or one of the above polymers functionalized with an acid, anhydride or epoxy functional group, or one of the above polymers grafted with maleic anhydride or glycidyl methacrylate, the above polymers optionally being crosslinked, and 25 to 45 parts of a blend comprising:
0.1 to 25 parts of the halogen-free fire retardant,
0.1 to 15 parts of the phosphorus-containing plasticizer, and
0.1 to 5 parts of a zeolite.

3. A composition according to claim 1 comprising, by weight based on 100 parts weight total:
55 to 75 parts of a blend of a component (A) comprising a polyamide and a component (B) comprising at least one of: a homopolymer or copolymer of alpha-olefins and/or diolefins, a metallocene polyethylene, a copolymer of ethylene with a salt or ester of an unsaturated carboxylic acid or a vinyl ester of a saturated carboxylic acid, or one of the above polymers functionalized with an acid, anhydride or epoxy functional group, or one of the above polymers grafted with maleic anhydride or glycidyl methacrylate, the above polymers optionally being crosslinked, and
25 to 45 parts of a blend comprising:
16 to 25 parts of the halogen-free fire retardant,
8 to 15 parts of the phosphorus-containing plasticizer, and
1 to 5 parts of a zeolite.

4. A composition according to claim 1, in which component (B) comprises: (i) a high-density polyethylene, and (ii) a blend of a polyethylene (C1) and a polymer (C2) selected from the group consisting of: elastomers, very low-density polyethylenes and ethylene copolymers, the (C)+(C2) blend being cografted with an unsaturated carboxylic acid.

5. A composition according to claim 1, in which component (B) comprises: (i) a high-density polyethylene, (ii) a polymer (C2) selected from the group consisting of: elastomers, very low-density polyethylenes and ethylene copolymers, (C2) being grafted by an unsaturated carboxylic acid, and (iii) a polymer (C2) selected from the group consisting of: elastomers, very low-density polyethylenes and ethylene copolymers.

6. A composition according to claim 1, in which component (B) comprises: (i) polypropylene and (ii) a polyolefin which results from the reaction of a polyamide (C4) with a copolymer (C3) comprising propylene and an unsaturated monomer X, grafted or copolymerized.

7. A composition according to claim 1, in which component (B) comprises: (i) a linear low density polyethylene, a very low density polyethylene, or a metallocene polyethylene and (ii) an ethylene/alkyl (meth)acrylate/maleic anhydride copolymer or an ethylene/vinyl acetate copolymer.

8. A composition according to claim 1, in which component (B) comprises two functionalized polymers comprising at least 50 mol % of ethylene units and able to react to form a crosslinked phase.

9. A composition according to claim 1, in which the fire retardant is selected from the group consisting of: ammonium phosphates, pyrophosphates, polyphosphates, melamine phosphates, melamine phosphite, piperazine phosphite, piperazine diphosphite, guanazole phosphate, melamine pyrophoshate and piperazine pyrophosphate.

10. A composition according to claim 1, in which the phosphorus-containing plasticizer is selected from the group consisting of: isopropylphenyl phosphate, diphenyl phosphate and triphenyl phosphate.

11. A composition according to claim 1, in which the zeolite is selected from the group consisting of: zeolites of the 3A, 4A, 5A, 10X and 13X type.

12. A composition according to claim 2, in which component (B) comprises: (i) a high-density polyethylene, and (ii) a blend of a polyethylene (C1) and a polymer (C2) selected from the group consisting of: elastomers, very low-density polyethylenes and ethylene copolymers, the (C)+(C2) blend being cografted with an unsaturated carboxylic acid.

13. A composition according to claim 2, in which component (B) comprises: (i) a high-density polyethylene, (ii) a polymer (C2) selected from the group consisting of: elastomers, very low-density polyethylenes and ethylene copolymers, (C2) being grafted by an unsaturated carboxylic acid, and (iii) a polymer (C2) selected from the group consisting of: elastomers, very low-density polyethylenes and ethylene copolymers.

14. A composition according to claim 2, in which component (B) comprises: (i) polypropylene and (ii) a polyolefin which results from the reaction of a polyamide (C4) with a copolymer (C3) comprising propylene and an unsaturated monomer X, grafted or copolymerized.

15. A composition according to claim 2, in which component (B) comprises: (i) a linear low density polyethylene, a very low density polyethylene, or a metallocene polyethylene and (ii) an ethylene/alkyl (meth)acrylate/maleic anhydride copolymer or an ethylene/vinyl acetate copolymer.

16. A composition according to claim 2, in which component (B) comprises two functionalized polymers comprising at least 50 mol % of ethylene units and able to react to form a crosslinked phase.

17. A composition according to claim 2, in which the fire retardant is selected from the group consisting of: ammonium phosphates, pyrophosphates, polyphosphates, melamine phosphates, melamine phosphite, piperazine phosphite, piperazine diphosphite, guanazole phosphate, melamine pyrophoshate and piperazine pyrophosphate.

18. A composition according to claim 2, in which the phosphorus-containing plasticizer is selected from the group consisting of: isopropylphenyl phosphate, diphenyl phosphate and triphenyl phosphate.

19. A composition according to claim 2, in which the zeolite is selected from the group consisting of: zeolites of the 3A, 4A, 5A, 10X and 13X type.

20. A composition according to claim 3, in which the fire retardant is selected from the group consisting of: ammonium phosphates, pyrophosphates, polyphosphates, inelamine phosphates, melamine phosphite, piperazine phosphite, piperazine diphosphite, guanazole phosphate, melamine pyrophoshate and piperazine pyrophosphate.

21. A composition according to claim 1, in which the phosphorus-containing plasticizer is a phosphoric acid ester.

22. A composition according to claim 1, in which the phosphorus-containing plasticizer is selected from the group consisting of isopropylphenyl phosphate, diphenyl phosphate and triphenyl phosphate.

23. A composition according to claim 2, in which the phosphorus-containing plasticizer is a phosphoric acid ester.

24. A composition according to claim 2, in which the phosphorus-containing plasticizer is selected from the group consisting of isopropylphenyl phosphate, diphenyl phosphate and triphenyl phosphate.

25. A composition according to claim 3, in which the phosphorus-containing plasticizer is a phosphoric acid ester.

26. A composition according to claim 3, in which the phosphorus-containing plasticizer is selected from the group consisting of isopropylphenyl phosphate, diphenyl phosphate and triphenyl phosphate.

27. A composition according to claim 1, which consists essentially of the blend of component (A) and component (B) and the blend of the halogen-free fire retardant, the phosphorus-containing plasticizer, and the zeolite.

28. A composition according to claim 2, which consists essentially of the blend of component (A) and component (B) and the blend of the halogen-free fire retardant, the phosphorus-containing plasticizer, and the zeolite.

29. A composition according to claim 3, which consists essentially of the blend of component (A) and component (B) and the blend of the halogen-free fire retardant, the phosphorus-containing plasticizer, and the zeolite.

* * * * *

UNITED STATES PATENT AND TRADEMARK OFFICE
CERTIFICATE OF CORRECTION

PATENT NO. : 7,235,604 B2
APPLICATION NO. : 10/602005
DATED : June 26, 2007
INVENTOR(S) : Philippe Blondel Page 1 of 1

It is certified that error appears in the above-identified patent and that said Letters Patent is hereby corrected as shown below:

Column 17, line 28 reads "the (C)+(C2) blend" should read -- the (C1)+(C2) blend --
Column 17, line 41 reads "copolyrner" should read -- copolymer --
Column 18, line 3 reads "the (C)+(C2) blend" should read -- the (C1)+(C2) blend --
Column 18, line 10 reads "a polymer (C2) selected" should read -- a polymer (C'2) selected --

Signed and Sealed this

Twenty-fourth Day of June, 2008

JON W. DUDAS
*Director of the United States Patent and Trademark Office*